US005632304A

United States Patent [19]

Kempka et al.

[11] Patent Number: 5,632,304

[45] Date of Patent: May 27, 1997

[54] EXHAUST BUTTERFLY SYSTEM

[75] Inventors: Karl H. Kempka, Esslingen; Dietmar Froese, Landau; Georg Reuther, Hochstadt; Christian Kroeger, Neustadt; Harald Bressler, Westheim, all of Germany

[73] Assignee: Mercedes-Benz AG, Stuttgart, Germany

[21] Appl. No.: 506,512

[22] Filed: Jul. 24, 1995

[30] Foreign Application Priority Data

Jul. 22, 1994 [DE] Germany .......................... 44 26 028.8

[51] Int. Cl.⁶ .......................................................... F16K 1/22

[52] U.S. Cl. .......................... 137/595; 251/306; 251/308

[58] Field of Search .................................... 137/595, 607; 251/308, 306, 307

[56] References Cited

U.S. PATENT DOCUMENTS

| | | | |
|---|---|---|---|
| 3,450,157 | 6/1969 | Hewson | 137/595 |
| 3,778,028 | 12/1973 | Graves et al. | 251/306 |
| 3,991,974 | 11/1976 | Bonafous | 251/306 |
| 4,225,112 | 9/1980 | Libke | 251/306 X |
| 4,877,339 | 10/1989 | Schuster et al. | 384/218 |
| 5,342,019 | 8/1994 | Braun et al. | 251/305 |
| 5,350,154 | 9/1994 | Takama et al. | 251/308 X |
| 5,427,141 | 6/1995 | Ohtsubo | 137/595 |

FOREIGN PATENT DOCUMENTS

| | | |
|---|---|---|
| 1013117 | 8/1957 | Germany . |
| 4229299 | 1/1994 | Germany . |
| 428318 | 7/1967 | Switzerland . |
| 2227368 | 10/1994 | United Kingdom . |

OTHER PUBLICATIONS

Japanese Abstract No. JP-57186035, vol. 7, No. 31 (M-192), Nov. 16, 1982.

*Primary Examiner*—Stephen M. Hepperle
*Attorney, Agent, or Firm*—Evenson, McKeown, Edwards & Lenahan, P.L.L.C.

[57] ABSTRACT

An exhaust butterfly in an exhaust conduit of an internal combustion engine is supported by way of bearing journals by positive plug-in connections. To simplify installation, the bearing journals and the bearing sleeves are designed in such a way that, to install the exhaust butterfly, the bearing journals are each pressed completely into the respective bearing sleeves counter to the force of a spring. In the case of a multiflow exhaust line, between adjacent exhaust lines cylindrical transverse passages are provided in each of which a driver is rotatably mounted. At one end, the driver has a recess which is designed as a bearing sleeve and into which the bearing journal of the first exhaust butterfly is inserted to produce a driving connection. The other end of the driver is designed as a bearing journal which is likewise inserted into a recess in the second exhaust butterfly to produce a driving connection.

6 Claims, 2 Drawing Sheets

EXHAUST BUTTERFLY SYSTEM

BACKGROUND AND SUMMARY OF THE INVENTION

The invention relates to an exhaust butterfly system in the exhaust line of an internal combustion engine and, more particularly, to an exhaust butterfly which is held on two opposite sides, in each case by a positive plug-in connection, in two bearing journals. Each of the bearing journals is rotatably mounted in a bearing sleeve. The first bearing journal is connected to an actuating device and at least the second bearing journal is preloaded against the exhaust butterfly by a spring acting in the direction of the pivoting axis of the exhaust butterfly and supported on the casing.

German Patent document 1,013,117 discloses an exhaust butterfly which has two recesses with an oblique edge. Into each recess a bearing journal can be inserted. The bearing journals have a receiving groove provided with a corresponding oblique surface. This device has the disadvantage that, for the installation of the exhaust butterfly, a hole has to be provided on both sides of the exhaust conduit, through which hole the respective bearing journal is inserted.

There is therefore needed an exhaust butterfly system in which the exhaust butterfly can be installed in a simple manner and in which functional reliability can be improved.

These needs are met by an exhaust butterfly system in an exhaust line of an internal combustion engine. The exhaust butterfly is held on two opposite sides, in each case by a positive plug-in connection, in two bearing journals. Each of the bearing journals is rotatably mounted in a bearing sleeve. The first bearing journal is connected to an actuating device and at least the second bearing journal is preloaded against the exhaust butterfly by a spring acting in the direction of the pivoting axis of the exhaust butterfly and supported on the casing. The bearing sleeve assigned to the second bearing journal is formed in a blind hole. The first bearing journal is also preloaded against the exhaust butterfly by a spring acting in the direction of the pivoting axis of the exhaust butterfly and supported on the casing. Both bearing journals are mounted movably in their bearing sleeves in such a way that both bearing journals can be pressed completely into the respective bearing sleeve counter to the force of the respective spring in order to install the exhaust butterfly.

The device according to the present invention has the advantage that, when installing the exhaust butterfly, the individual components can be joined together in a simple manner by a plug-in action. The second bearing journal can be inserted into the bearing sleeve from inside, thus making it possible to dispense with a second opening in the exhaust conduit. This reduces the number of possible sources of leaks in the exhaust conduit. Only the first bearing journal must be inserted via a hole from the outside.

In the case of a multi-flow exhaust line, one hole is likewise all that is necessary in the exhaust conduit. In this case, the individual components, with the exception of the first bearing journal, can likewise all be installed from the inside by a simple process of inserting them into one another.

Other objects, advantages and novel features of the present invention will become apparent from the following detailed description of the invention when considered in conjunction with the accompanying drawings.

DETAILED DESCRIPTION OF THE DRAWINGS

Figure 1:
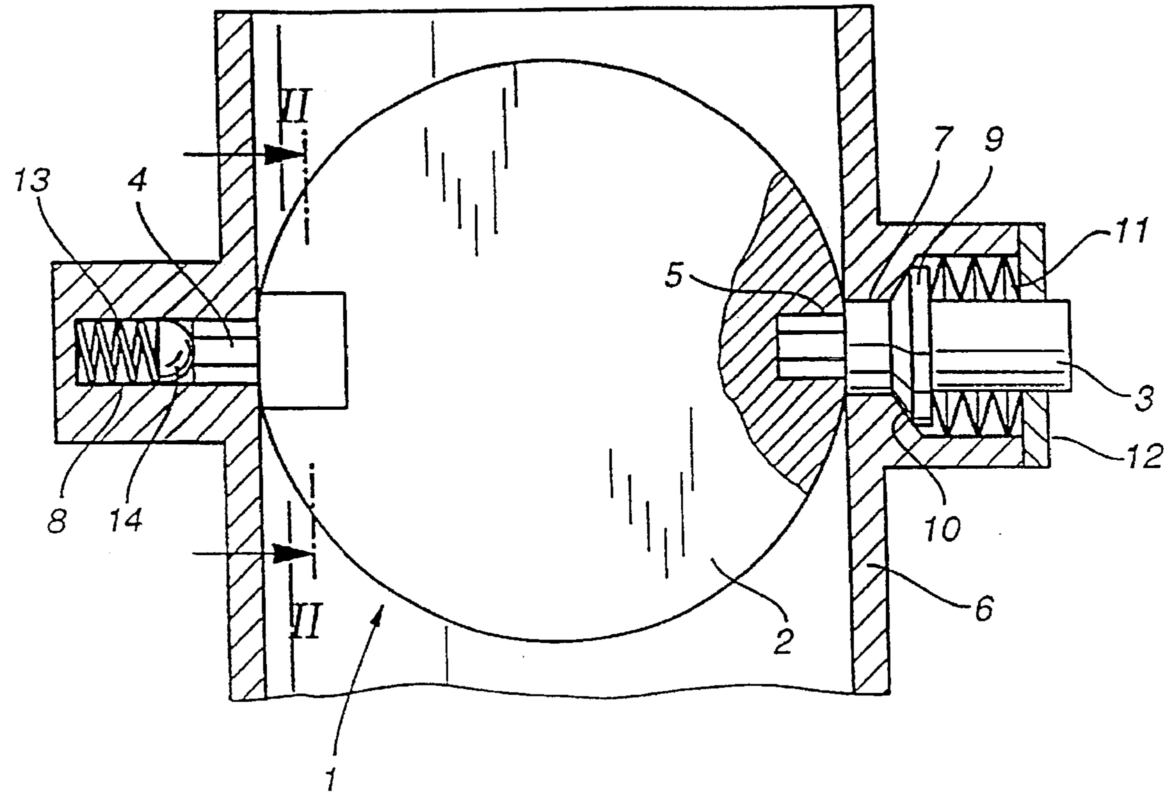
FIG. 1 is a cross-section view of an exhaust butterfly system.

FIG. 1 shows an exhaust conduit 1 of an internal combustion engine (not shown). An exhaust butterfly 2 is arranged in the exhaust conduit 1. The exhaust butterfly 2 is held rotatably in the exhaust conduit 1 by way of two bearing journals 3, 4. Hexagonal profiles are formed on the bearing journals 3, 4, at least at their ends facing the exhaust butterfly 2. Inward-formed hexagonal recesses 5 are arranged in a corresponding fashion on opposite sides of the exhaust butterfly 2. The bearing journals 3, 4 can be inserted with a positive fit into the recesses 5 to form a driving connection. Respective cylindrical bearing sleeves 7, 8 are machined into the casing 6 of the exhaust conduit 1 on opposite sides to support the exhaust butterfly 2.

The first bearing sleeve 7 is designed as a hole in the casing 6, through which the bearing journal 3 can be inserted into the exhaust conduit 1 from outside. Outside the exhaust conduit 1, the bearing journal 3 can be connected to an actuating device (not shown) to allow the exhaust butterfly 2 to be actuated. On its circumference, the bearing journal 3 has an annular collar 9 of spherical design which, due to the force of a Belleville spring 11, rests against a bevel 10 arranged on the circumference of the bearing sleeve 7, thus providing a very good seal of the exhaust conduit 1 from the environment. The Belleville spring 11 is supported on the annular collar 9 and on another bearing sleeve 12, which is connected to the casing 6.

The second bearing sleeve 8 is designed as a cylindrical blind hole in the casing 6, no connection to the environment being provided. Therefore, no leakage can occur at this point. Arranged in the blind hole 8 is a spring 13. The spring 13 has the result that the bearing journal 4 is held in the associated recess 5 in the exhaust butterfly 2. To minimize friction between the spring 13 and the bearing journal 4, a spherical element 14 can be inserted. Since the bearing journal 4 does not serve as a driving connection at this point but merely as a bearing, it can also have a simple cylindrical shape instead of a hexagonal profile.

During the installation of the exhaust butterfly 2, the bearing journal 3 is first of all inserted through the hole 7 from outside. The Belleville spring 11 and the other bearing sleeve 12 are then mounted on the bearing journal 3 from outside and the other bearing sleeve 12 is then connected to the casing 6. The force of the Belleville spring 11 pushes the bearing journal 3 into the hole 7 until the annular collar 9 rests against the bevel 10. In the second step, the spring 13, the spherical element 14 and the second bearing journal 4 are inserted in the blind hole 8. To install the exhaust butterfly 2, both bearing journals 3, 4 are then pressed into the corresponding bearing sleeves 7, 8 and the recesses 5 of the exhaust butterfly 2 are brought into overlap with the bearing journals 3, 4. The bearing journals 3, 4 then engage in the recesses 5 by virtue of the force of the springs 11, 13. However, it is also possible to install the second bearing journal first and to insert the first bearing journal 3 into the recess 5 in the exhaust butterfly 2 from outside through the bearing sleeve 7 only after the installation of the exhaust butterfly 2. After the mounting of the Belleville spring 11, the first bearing journal 3 is then fixed by the attachment of the second bearing sleeve 12.

Figure 2:
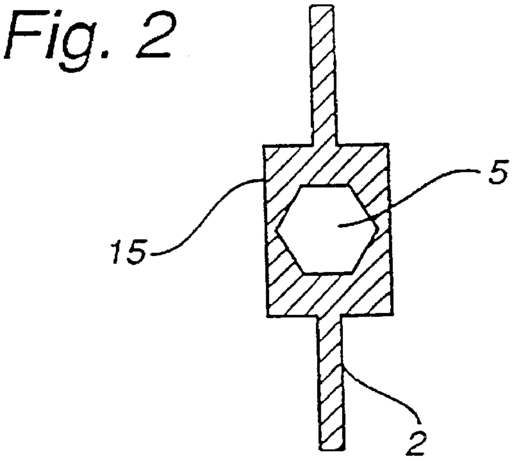
FIG. 2 is a cross-sectional view of the exhaust butterfly from FIG. 1 taken along the line I—I.

In FIG. 2, the exhaust butterfly 2 from FIG. 1 is shown in section taken along the line II—II. In the region of its pivoting axis, the exhaust butterfly 2 has small raised portions 15, into which hexagonal recesses 5 are made to accommodate the bearing journals 3, 4. As a departure from this exemplary embodiment, it is of course also possible to use other profiles which are not rotationally symmetrical.

Figure 3:
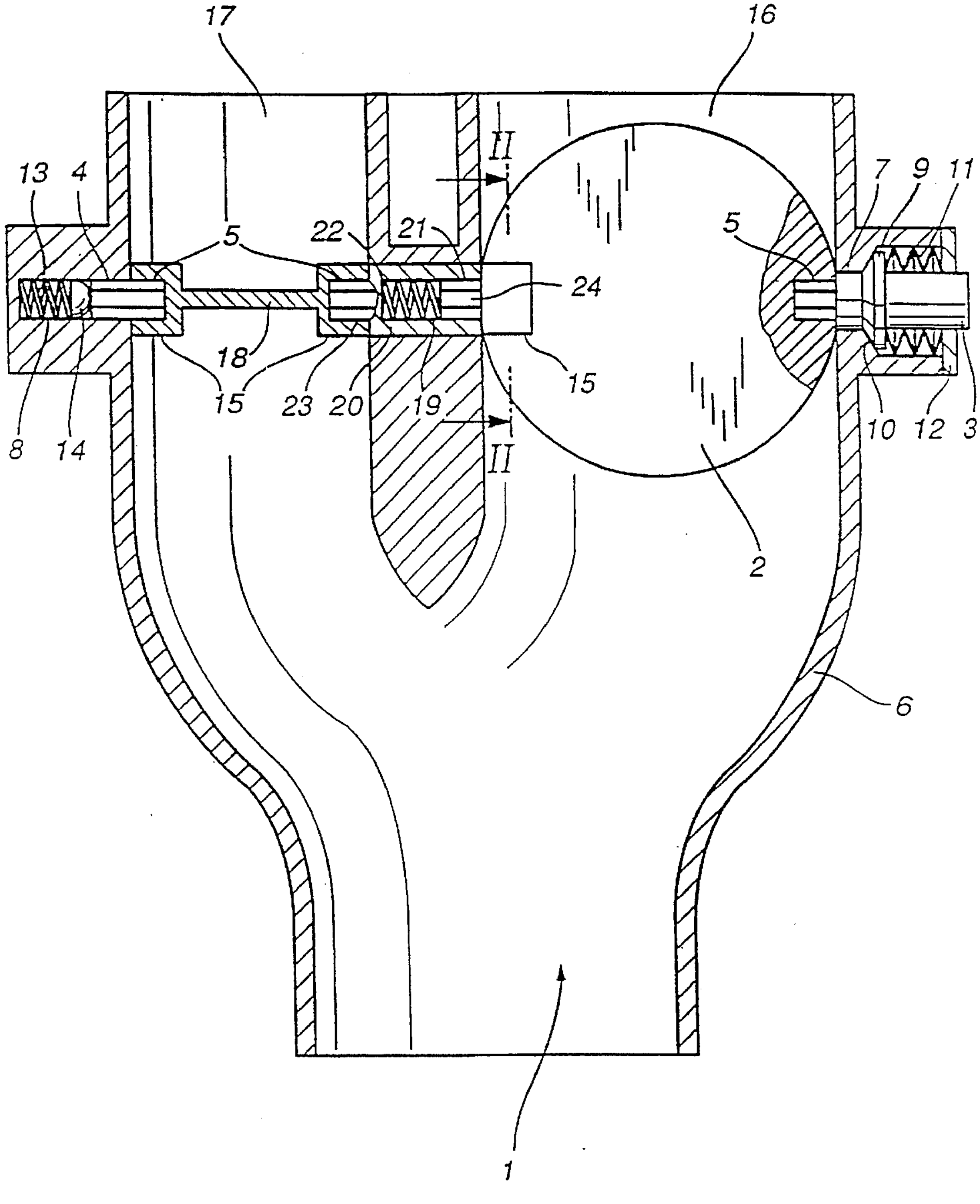
FIG. 3 is a sectional view illustration of a double-flow exhaust line with an exhaust butterfly system according to the present invention.

FIG. 3 shows another exemplary embodiment of an exhaust butterfly system according to the invention in a multi-flow exhaust system. In FIG. 3, parts which are the same as those in FIG. 1 are denoted by the same reference numerals. The casing 6 is designed here in such a way that the exhaust conduit 1 is divided into a first and a second exhaust line 16, 17. An exhaust butterfly 2, 18 is provided in each of the two exhaust lines 16, 17. The two exhaust butterflies 2, 18 have a common pivoting axis and the two exhaust butterflies 2, 18 are arranged rotated through 90° relative to one another. The first exhaust butterfly 2 is thus shown in plan view, the exhaust butterfly 2 being cut away in the region of the first bearing journal 3. The second exhaust butterfly 18, on the other hand, is shown in section. The two exhaust lines 16, 17 are thus closed and opened alternatively by the exhaust butterflies 2, 18. On opposite sides, the exhaust butterflies 2, 18 each bear small raised portions 15 into which hexagonal recesses 5 are machined.

A cylindrical transverse passage 19 in which a driver 20 is rotatably mounted is arranged between the exhaust lines 16, 17, coaxially to the common pivoting axis of the exhaust butterflies 2, 18. At the end associated with the first exhaust butterfly 2, the driver 20 has a hexagonal recess 21 into which a spring 22 and another bearing journal 24 can be inserted to form a driving connection with the first exhaust butterfly 2. For this purpose, the bearing journal 24 must have a hexagonal profile at both ends. At the end facing the second exhaust butterfly 18, the driver 20 has formed on it a corresponding hexagonal profile 23 which serves as a bearing journal for the second exhaust butterfly 18. The second exhaust butterfly 18 is supported in a manner analogous to that in the first exemplary embodiment.

In the installation of the exhaust butterflies, the following procedure is adopted: the spring 13, the spherical element 14 and the bearing journal 4 are first of all inserted into the blind hole 8. To install the second exhaust butterfly 18, the bearing journal 4 is then pressed into the blind hole 8 and the recess 5 in the exhaust butterfly 18 is brought into overlap with the profile of the bearing journal 4. The bearing journal 4 will then engage in the recess 5 by virtue of the force of the spring 13. In the next step, the driver 20 can then be inserted into the transverse passage 19 from the direction of the first exhaust line 16 until the profile 22 of the driver 20 engages in the recess 5 in the second exhaust butterfly 18. Next, the spring 22 and another bearing journal 24 are then inserted into the recess 21 in the driver 20. To install the first exhaust butterfly 2, the bearing journal 24 is then, in a procedure similar to that for the second exhaust butterfly 18, first of all pressed into the recess 21, after which the exhaust butterfly 2 is installed and, finally, the exhaust butterfly 2 is fixed by inserting the first bearing journal 3 into the recess 5 in the exhaust butterfly 2 through the bearing sleeve 7. After the mounting of the Belleville spring 11, the first bearing journal 3 is then fixed on the casing 6 by the attachment of the bearing sleeve 12.

The transverse passage 19 ensures that no exhaust gas can escape into the environment between the two exhaust lines 16, 17. That is to say that, irrespective of the number of exhaust lines, the exhaust butterfly system according to the invention only ever has a single connection to the environment. In order to make this opening and also the connections between the individual exhaust lines as leaktight as possible, it is proposed that the entire exhaust butterfly system or, alternatively, only parts of it, should be manufactured from a ceramic material. Since ceramic materials have a low thermal coefficient of expansion, good seating of the driver 20 in the transverse passage 21, of the bearing journals 3, 4 in the bearing sleeves 7, 8, and of the annular collar 9 on the bevel 10 can be guaranteed even in the case of large temperature fluctuations such as those which occur in exhaust conduits 1 of internal combustion engines. The ceramic material furthermore has the advantage that the profiles and recesses on the exhaust butterflies 2, 18 and on the driver 20 are very simple to produce. For this purpose, the corresponding shapes are formed right at the green compact stage of manufacture and it is thus no longer necessary to machine the finished part.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An exhaust butterfly system for use in at least one exhaust line of an internal combustion engine, comprising:

an exhaust butterfly arranged in the exhaust line;

first and second bearing journals, said first and second bearing journals rotatably holding said exhaust butterfly on two opposite sides in the exhaust line via positive plug-in connections;

first and second bearing sleeves, said first and second bearing journals being rotatably mounted in said first and second bearing sleeves, respectively;

an actuating device coupled to said first bearing journal;

a spring arranged so as to preload at least the second bearing journal against said exhaust butterfly, said spring acting in a direction of a pivoting axis of said exhaust butterfly and being supported on a casing for the at least one exhaust line;

wherein the second bearing sleeve assigned to the second bearing journal is formed in a blind hole and on the casing;

wherein the first bearing journal is preloaded against said exhaust butterfly by a second spring acting in the direction of the pivoting axis of the exhaust butterfly and being supported on the casing;

wherein said first and second bearing journals are movably mounted in their respective first and second bearing sleeves such that said first and second bearing journals retract completely into their respective first and second bearing sleeves counter to a force of the respective first and second springs in order to install the exhaust butterfly.

2. An exhaust butterfly system according to claim 1 for use in a multi-flow exhaust conduit having at least two exhaust lines, wherein the exhaust butterfly is arranged in one of said at least two exhaust lines and a further exhaust butterfly is arranged in the other of said two exhaust lines;

wherein adjacent portions of said at least two exhaust lines have a common dividing wall, said common dividing wall including a through hole in which a common bearing journal is arranged so as to rotatably drive the coaxially arranged exhaust butterfly and further exhaust butterfly;

further wherein said common bearing journal includes, at an end facing the further exhaust butterfly, a profile which is inserted into a recess in the further exhaust butterfly to form a positive driving connection; and still further wherein at an end facing the exhaust butterfly, the common bearing journal has a recess into which the second bearing journal of the exhaust butterfly is inserted in a positively fixed manner counter to the force of the spring.

3. An exhaust butterfly system according to claim 1, wherein at least one of the exhaust butterfly, the first and second bearing journals and the casing are manufactured from a ceramic material.

4. An exhaust butterfly system according to claim 2, wherein at least one of the exhaust butterfly and further exhaust butterfly, the first, second and common bearing journals, and the casing are manufactured from a ceramic material.

5. An exhaust butterfly system according to claim 1, wherein the positive plug-in connection comprises a hexagonal recess machined inwardly into the exhaust butterfly and a hexagonal profile formed outwardly on an associated bearing journal, at least in an end region facing the exhaust butterfly.

6. An exhaust butterfly system according to claim 2, wherein the positive plug-in connection comprises a hexagonal recess machined inwardly into the exhaust butterfly and a hexagonal profile formed outwardly on an associated bearing journal, at least in an end region facing the exhaust butterfly.

* * * * *